Aug. 15, 1967 E. C. BERTOLET, JR 3,335,758
PLASTIC-LINED CONDUIT
Filed Sept. 22, 1964
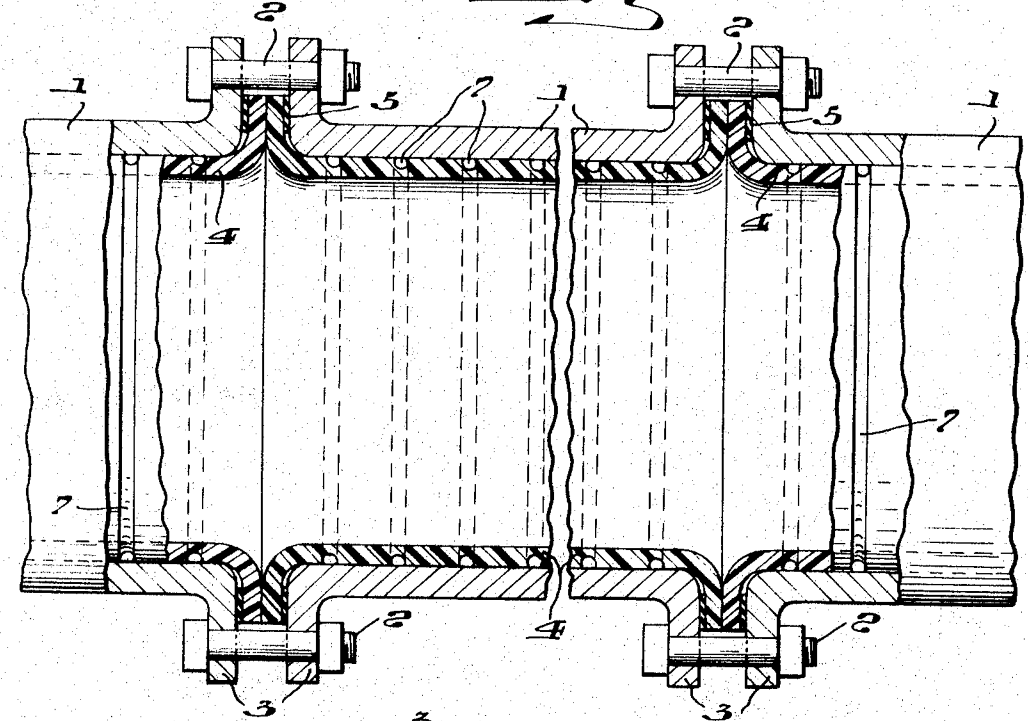
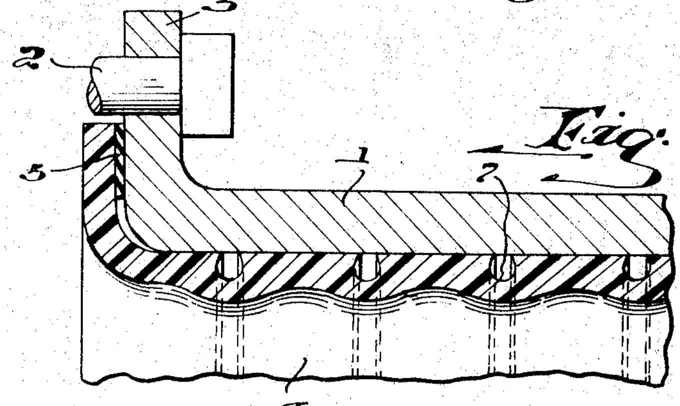
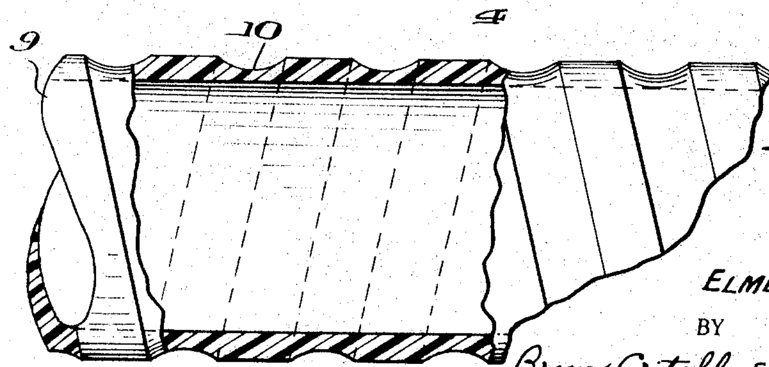
INVENTOR.
ELMER C. BERTOLET, JR
BY
Brown, Critchlow, Flick & Peckham.
his ATTORNEYS.

United States Patent Office 3,335,758
Patented Aug. 15, 1967

3,335,758

PLASTIC-LINED CONDUIT

Elmer C. Bertolet, Jr., % TFE Company, P.O. Box 3382, Austin, Tex. 78704

Filed Sept. 22, 1964, Ser. No. 398,307
6 Claims. (Cl. 138—140)

This invention relates to conductors for high temperature fluids, and more particularly to conduits provided with plastic liners.

Heretofore, many approaches have been made to the problem of providing satisfactory linings for conduits, such as pipes and fittings, in order to upgrade the conduits. For example, there are many plastics that possess properties not found in metallic pipes; e.g., smoothness of inner surface, deformability, light weight, resistance to corrosion or attack by certain fluids, and the like. On the other hand, most plastics are inferior in strength to metallic materials, whereby the pressures capable of being held by piping or tubing composed entirely of a plastic are limited. In addition, most plastics utilized for piping are thermoplastic in nature, which further reduces their utility due to lowering at elevated temperatures their modest pressure capabilities.

Much work hase been devoted to the lining of standard metal pipe with plastics, and some attempts have been successful to a limited extent. The limitations on the use of such linings have stemmed largely from the differential coefficients of thermal expansion of the plastics and metals involved, a ratio that may run as high as 13 to 1. To prevent linear growth at elevated temperatures, efforts have been made to anchor the linings to the pipes mechanically or by adhesives. At temperatures up to approximately 175° F. this has been successful, but at higher temperatures the continuation of expansion of the liner will produce problems, due to the inability to hold the liner in position because considerable forces are exerted by expanding plastics. Also, if a liner is held rigidly to length in a pipe, all expansion will have to be taken radially, thereby causing severe buckling which makes the product unusable and amounts to a failure due to the possibility of permanent deformation of the liner.

Another proposal has been to prestress the plastic linings by application of heat and longitudinal stresses to a plastic liner in the form of a tube so that a tube of nominal size larger than the pipe internal diameter will be drawn to such a size as to allow the liner to be inserted in the pipe. Subsequent heating of the assembly supposedly causes a stress relief which, in effect, is supposed to offset the linear coefficient of expansion effects at elevated temperatures. This approach calls for extreme care in preparation of the liner to maintain this balance, and it is practically impossible to produce tubular liners commercially which will always contain the same stresses prior to installation in the pipes.

Still further approaches have been to coat the inside of pipes by various means such as by spraying of solvent solutions, using fluidized bed coating techniques, spraying finely divided powders against a heated pipe wall, using dispersions, and the like. Such methods require a considerable investment of money and are subject to limitations in film coating thickness wherein, after deposition of a coating thickness ranging from .002 inch to .010 inch, the coating must be fused before additional layers can be applied to it. While coatings applied in this manner are well bonded to the pipe surface and, being thin, do not tend to buckle or creep when subjected to high temperatures, the very thinness of the coating and the method of application tends toward porosity from incomplete coalescence of the coating when fused. Thin coatings also are more likely to be permeable to various fluids being transported by the pipe. Furthermore, thin coatings do not present the resistance to abrasion presented by heavier linings, where any tendency toward abrasion is encountered in the fluid being carried.

The most universal material from a corrosion-resistant, heat-resistant and nonadhering standpoint is polytetrafluoroethylene resin. This particular resin, due to its lack of a true melting point, is not amenable to solution coating of a pipe nor to any other method requiring subsequent fusion of the dispersed particles, such as flock coating, fluidized bed coating and the like. While this particular material is in most cases desirable from an overall quality standpoint, its very nature requires its use as an insertable liner of comparatively heavy wall thickness, due to the necessity for preparing the liner in a self-supporting form by molding or extrusion techniques well known in the art. Use of a heavy wall liner has resulted heretofore in problems when the liner has been subjected to elevated temperatures in a pipe. The longer a given section of the liner, the greater the difficulties arising from linear growth at high temperatures. For example, a one foot long liner made of polytetrafluoroethylene will grow up to .43 inch when heated from 70° to 350° F., while a steel pipe surrounding it would grow approximately .03 inch. For this reason, few lengths of polytetrafluoroethylene-lined pipe greater than ten feet have ever been offered commercially. In addition, working temperature with such conductors are usually limited to the 250° F. range when these lengths are used.

It is among the objects of this invention to provide a conduit provided with a preformed plastic liner, which permits the conductor to be used with fluids at the maximum service temperature of the liner plastic without limiting the length of the individual conductor sections, and which will not separate from the encircling wall of the conduit or buckle inwardly sufficiently to interfere with flow of fluid.

In accordance with this invention, a conduit contains a preformed plastic liner in engagement with its inner surface. The liner has a greater thermal coefficient of linear expansion that the conduit and has end portions adapted to be anchored to the ends of the conduit. The outside of the liner has a plurality of encircling grooves therein, either joined end to end or completely separate, providing the liner with portions of reduced wall thickness that will buckle inwardly when the liner is heated and attempts to expand lengthwise relative to the conduit. There is a sufficient number of the grooves to maintain the sections of the heated liner between the grooves in engagement with the encircling wall of the conduit.

The invention is illustrated in the accompanying drawings, in which

FIG. 1 is a view of a fluid conductor shown partly in longitudinal section;

FIG. 2 is an enlarged fragmentary view of the conductor showing the general appearance of the plastic liner under high temperature conditions; and FIG. 3 is a view of a modified liner, shown partly in longitudinal section.

Referring to FIG. 1 of the drawings, a series of conduits 1 are connected together by bolts 2 extending through radial flanges 3 at their ends. Of course, a conduit can be a "fitting," such as an L or a T, as well as a straight or curved pipe. Generally, the conduits will be rigid and made of metal, reinforced plastic or other suitable material. Metal is generally preferred because of its ready availability, high strength and high temperature properties, and ease with which metal conduits can be attached together. Each conduit or pipe contains a liner 4 of plastic that has a materially greater thermal coefficient of expansion than the pipe. The liner has been preformed, as distinguished from a lining built up in a pipe by spraying it in place for example. The liner engages the inner surface of the pipe, but preferably does not adhere to it so that there will be no interference with unrestricted expansion throughout the entire length of the liner when it is heated by a hot fluid flowing through the conductor formed by the liner conduit. The liner can be held in position in the pipe by flaring the ends of the liner so that they will engage the pipe flanges. Suitable gaskets 5 may be inserted between the liner flanges and the pipe flanges if desired. When the pipes are bolted together, the adjoining liner flanges will be pressed tightly together to prevent leakage at the joints. The gaskets should be made of material with low cold flow properties, such as compressed asbestos sheet, to reduce the flow tendency of the liner material and thereby lessen the danger of leakage between the conduits and the necessity for retightening the flange bolts after the pipe has been placed in service.

Various plastics may be used as the material for the liner, such as polyethylene, polypropylene, polyvinyl chloride and polytetrafluorethylene, but the latter is preferred because of its resistance to corrosion and heat.

Of course, the pipe can have any desired wall thickness. On the other hand, the wall thickness of the liner normally should be within the range of 1/16 to 3/16 inch, preferably between 3/32 and 5/32 to achieve a balance of economics and freedom from permeability. Heavier liners can be used, but they are economically undesirable. Liners thinner than 1/16 inch might result, as will be shown presently, in areas of wall thickness that are so thin that there would be danger of the wall being penetrated by the fluid flowing through the conductor.

It is a feature of this invention that the conduit liner is mechanically weakened at longitudinally spaced intervals in order to provide annular wall portions of such reduced thickness that they will buckle inwardly slightly when the liner is heated and attempts to expand lengthwise relative to the pipe. By providing a number of areas of controlled slight buckling, excessive buckling concentrated at one point and that might cause the liner to collapse is avoided. The weakening of the liner is accomplished by forming encircling grooves 7 in the outside of it. For best results, these grooves should be spaced uniformly along the liner. They may be formed in any conventional manner, such as by molding, machining, grinding or skiving. Also, the grooves may be entirely separated from one another or they may be formed by the successive convolutions of a continuous helical groove and therefore connected end to end. The depth of the grooves should be between 1/3 and 2/3 of the normal wall thickness of the liner. Preferably, the grooves have a depth about one half the wall thickness. On that basis and with a wall only 1/16 inch thick, the thickness of the material at the base of the grooves would be reduced to about 1/32 inch, which is about as thin as the liner should be to avoid permeability. It should not be thinner than .020 inch in any case. On the other hand, if the wall thickness of the liner is not reduced at least 1/3 by the grooves, the liner normally will not be weakened sufficiently to allow the desired controlled buckling. A reduction of more than 2/3 is not required for accomplishing the desired result. The grooves cause the thermal expansion of the heated liner to be concentrated in radial buckling of the reduced wall areas at the bases of the grooves as shown in FIG. 2, thereby eliminating the problem heretofore experienced in trying to use liners having coefficients of thermal expansion different from those of the surrounding conduits.

The width of the grooves is variable through quite a range, but generally grooves 1/8 inch wide serve satisfactorily. Likewise, the spacing of the grooves is not limited to any particular distance, as long as the total number and size of the grooves are sufficient to allow buckling to occur at the desired points without becoming excessive. Excessive buckling could seriously impede the flow of fluid through the conductor or create excessive turbulence. In other words, the number of grooves of any given size should be sufficient to maintain the sections of the liner between the grooves in engagement with the encircling wall of the pipe when the liner is heated to a high enough temperature to cause it to attempt to expand lengthwise relative to the pipe.

It will be seen that the wall reduction area as well as the spacing and shape of the grooves can readily be calculated to achieve the desired effect. The more closely spaced the grooves are, the less the buckling at each groove. Likewise, the higher the desired temperature service for the conductor, the more desirable it is to have a large number of grooves. The actual shape of the grooves should be such that the least possible stress concentration effect is produced on the liner when it expands, so that repeated temperature cycling will not tend to produce stress fatigue in the liner. Grooves with parallel sides merging into curved bottoms are satisfactory.

The manner in which the plastic liner should be grooved to allow the desired controlled thermal expansion to take place can be roughly calculated from the linear thermal expansion characteristics of the plastic from which the liner is made. Thus polytetrafluorethylene has a linear expansion of 1% at 212° F., 3% at 410° F. and 5% at 550° F. The controlling factor in the number of grooves (or spacings) and the width of the grooves can be stated empirically as follows, allowing for an adequate safety factor to ensure minimum buckling at any given location: The percentage of groove width to the center-to-center distance between adjacent grooves is satisfactory when it is at least three or four times the percentage which the plastic used would expand at the temperature at which it is to be used. Thus, with a groove width of 1/8 inch and a distance of 1/2 inch between the centers of the adjacent grooves, the groove width is 25% of that distance. 25% is more than four times the 5% by which polytetrafluorethylene expands at 550° F., so the groove width and spacing just mentioned would be satisfactory for that temperature. Obviously, they also would be satisfactory for lower temperatures, but for the lower temperatures it is not necessary to have so many grooves. For example, at 212° F. where the expansion of the plastic is only 1%, 1/8 inch wide grooves spaced 3 inches apart on center would produce a satisfactory result because 1/8 inch is 4.17% of 3 inches, and 4.17% is more than four times the 1% expansion of the liner.

In the modification shown in FIG. 3, the plastic liner 9 is provided with proportionately wider grooves 10 than in FIG. 1, and having a different shape. This shape of groove is especially desirable for plastics with notch-sensitivity, in order to reduce the possibility of stress fatigue upon repeated temperature cycling. The grooves also are shown as successive convolutions of a long helical groove, so the spaces between them likewise form a helix.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A conductor for high temperature fluids, comprising a conduit, and a plastic liner in the conduit in engagement therewith having a greater thermal coefficient of linear expansion than the conduit and having end portions adapted to be anchored to the ends of the conduit, the liner normally having a substantially uniform inside diameter between said end portions, and the outside of the liner having a plurality of encircling grooves therein extending substantially half way through the liner wall to provide the liner with portions of reduced wall thickness that will buckle inwardly when the liner is heated and attempts to expand lengthwise relative to the conduit, there being a sufficient number of said grooves to maintain the sections of the heated liner between the grooves in engagement with the encircling wall of the conduit.

2. A conductor according to claim 1, in which the depth of said grooves is between ⅓ and ⅔ of the normal wall thickness of the liner.

3. A conductor according to claim 1, in which the thickness of said reduced wall portions of the liner is at least .02 inch.

4. A conductor according to claim 1, in which the thickness of the liner wall between said grooves is between $\frac{1}{16}$ and $\frac{3}{16}$ inch, and the depth of the grooves is between about ⅓ and ⅔ of said wall thickness.

5. A conductor according to claim 1, in which the thickness of the liner wall between said grooves is between $\frac{3}{32}$ and $\frac{5}{32}$ inch, and the depth of the grooves is about ½ of said wall thickness.

6. A conductor for high temperature fluids, comprising a conduit, and a plastic liner in the conduit in engagement therewith having a greater thermal coefficient of linear expansion than the conduit and having end portions adapted to be anchored to the ends of the conduit, the outside of the liner having a plurality of encircling grooves therein providing the liner with portions of reduced wall thickness that will buckle inwardly when the liner is heated and attempts to expand lengthwise relative to the conduit, and the percentage of groove width to the center-to-center distance between adjacent grooves is at least three times the percentage by which the liner would expand lengthwise if unconfined and heated to the maximum temperature to which the liner would be subjected in use in said conduit.

References Cited

UNITED STATES PATENTS

| | | | |
|---|---|---|---|
| 403,644 | 5/1889 | Brown | 220—63 X |
| 2,284,761 | 6/1942 | Nathan | 285—55 X |
| 2,290,333 | 7/1942 | Johnson | 138—140 X |
| 2,331,140 | 10/1943 | Schmidt | 138—147 X |
| 3,143,147 | 8/1964 | Sellars et al. | 138—140 |

LAVERNE D. GEIGER, *Primary Examiner.*

C. L. HOUCK, *Assistant Examiner.*